Patented Apr. 3, 1951

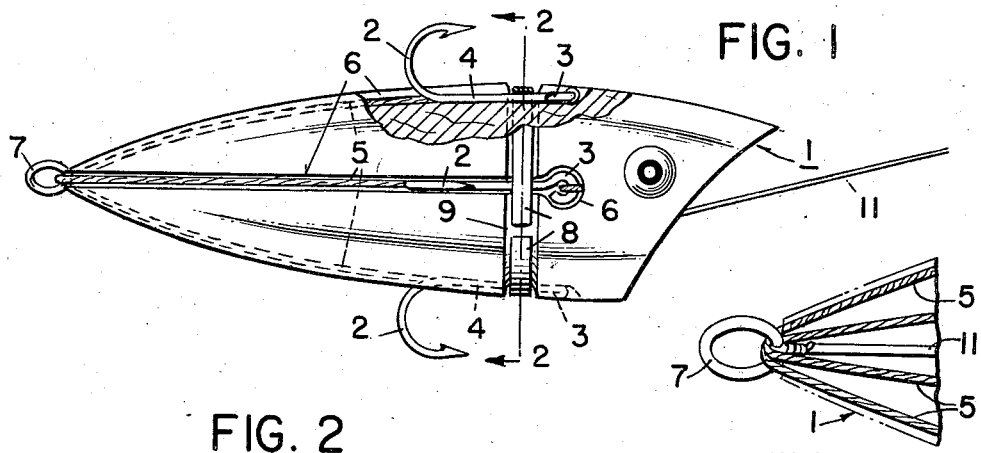

2,547,279

UNITED STATES PATENT OFFICE 2,547,279

FISH PLUG

George Henry Patterson, Seattle, Wash.

Application January 20, 1947, Serial No. 723,109

7 Claims. (Cl. 43—42.05)

The present invention relates to fish plugs.

A fish plug, of the general type contemplated by this invention, comprises a body member adapted to be fastened to a line for pulling through the water and having mounted directly on it a hook or a plurality of hooks intended to be taken by a fish.

Most fish plugs have their hooks more or less securely and immovably affixed to the body member of the plug. However, there is a class of plugs in which the hooks are mounted for movement on the body members. Generally this movement is intended to take place when the fish takes a hook, and the arrangement is usually such that the hook, caught in the mouth of the fish, may be pulled free of its original position on the body member but be kept connected thereto to hold the fish secured to the plug and the line.

It is to this latter class of plugs that the present invention relates. It provides a novel arrangement for yieldably securing a plurality of hooks to a body member in such a way that each hook is originally mounted on the plug in a position facilitating access of the fish to it and permitting the hook, when taken by the fish, to be pulled free of the plug while maintained connected thereto after moving through a short limited distance during which movement the fish is generally securely impaled on the hook with no opportunity to escape therefrom.

A principal object of the invention is to provide an arrangement of the class described in which each hook can be rapidly and easily set in original position.

Another object is to provide a fish plug of this type which can be made at extremely low cost and which will be durable in use and unfailing in operation.

An important object is to arrange the parts of the complete plug construction in such a way that a fish taking the hook will be unable to free the hook from its mouth by prying against the body member carrying the hook, so that once caught in the mouth of the fish the hook will become separated from the body member and any further movement by the fish will operate to set the hook more firmly in its mouth.

A related object is to provide for a yielding or resilient movement of the hook with relation to the body member so that the tension by which the hook is finally stopped at the limit of its separation from the body member will not be abruptly applied by the retreating fish. Thus the danger of the hook tearing through the mouth of the fish and liberating the fish is minimized.

Another object is to arrange the hook or hooks for detachment from the plug upon the breaking of any hook leader or of the fishing line, thus insuring against loss of the plug with an escaping fish which has broken the line or a leader.

Other and further objects are contemplated for the invention and will be evident to those skilled in the art from the present disclosure of one form of the invention which has been thoroughly tested in actual practice and found entirely satisfactory and which is therefore at present preferred by me.

This embodiment is illustrated by the accompanying drawing, in which:

Figure 1 is a side elevational view, on substantially full scale, of a plug embodying the invention, with certain of the parts broken away for better illustration;

Fig. 2 is a transverse cross-sectional view taken on the line 2—2 of Fig. 1;

Fig. 3 is a rear end elevational view;

Fig. 4 is a side elevational view, on a relatively reduced scale, showing the parts in the position which they assume after one of the hooks has been taken by a fish and pulled to the limit of its separation from the body member;

Fig. 5 is a central longitudinal cross-sectional view of the body member of the plug; and Fig. 6 is a detail view of the trailing edge of the body member somewhat distorted to show diagrammatically the connection of the line 11 to the ring 7 and both of the leaders 5 passing through the ring.

Referring to the figures, the device includes a body member 1 in the form of a more or less solid plug of wood or the like, preferably having a circular cross-section shape tapered to substantially a point at its trailing end or at both ends. The precise shape of the body, and its surface finish and decoration, are matters of selection and form no part of the present invention.

Generally speaking, the invention contemplates mounting on the body a pair of hooks fastened to the opposite ends of a single leader and arranged to be pulled by a fish from the body in two stages of movement, both of which stages are yieldably resisted so that the movement is finally terminated without shock or abruptness that might tear the hook from the mouth of the fish.

All of this is accomplished by the arrangement shown in the drawing. A pair of hooks 2, 2 have the usual enlarged eyes 3 at the rear end of the shank 4 of each of them, and both eyes are connected to the opposite ends of a single leader 5 of such length that each hook can be laid in the forward end of a slot 6 cut lengthwise along diametrically opposite portions of the surface of the body member 1, with the hook points facing forwardly at about the middle of the length of the body member and with the leader lying in the two slots 6 and passed through a ring or eye 7 which extends from the trailing edge of the body member.

Yieldably releasable means such as the resilient band 8 transversely encircles the body member at the zone of the hook shanks or of the eyes 3 thereof and releasably holds the hooks in their slots 6. It is convenient to make the band 8 in the form of a split strip of spring metal and to hold it in a slot 9 by means of a screw 10 threaded through the body member sufficiently far from each of the slots 6 to permit the band 8 to yield enough, when either of the hooks is pulled, to free that hook from its position under the band.

The body is bored, as shown at 12, more or less along its longitudinal axis for passing a line 11 by which the body is pulled through the water in the usual way. It is to the tail end of this line 11 that the ring or eye 7 is connected, and the plug body member is made freely slidable on the line except to the extent to which it is kept at the tail end of the line by the cooperation of the ring 7, which is too large to pass through the bore 12, and the leaders 5, which are passed through the ring and are attached to the body. An important point about the arrangement is that the body is not directly fastened to the line, thus producing certain advantages which will be hereinafter explained.

The body may optionally be provided with any usual shape or appurtenance for causing it to float, spin, wiggle or engage in any other type of action, depending on the kind of fishing operation in which it is intended to be used, and the hooks 2 may of course be of any appropriate kind, shape and size.

When a fish takes either of the hooks 2 it pulls on the hook and the band 8 expands enough to release the hook from its position in the slot 6. Continuing tension imposed on the leader 5 causes the leader to be pulled through the ring 7, releasing the hook at the other end of the leader from its position under the band 8, which release is yieldably resisted by the flexing of the band. When the second hook is released the fish can pull further on the first hook to bring the eye 3 of the second hook up to the ring 7, but at this point further movement is prevented by the inability of the eye 3 of the second hook to pass through the ring. Thus the fish is held captive at a distance from the plug body member equal to the length of the leader, as indicated in Fig. 4.

A fish thus held has little chance to escape, because it has become securely caught on the hook during the two yieldable stages of movement of the hook from its original position and because the fish has no solid body member against which to pry or exert leverage in an effort to straighten out the hook or otherwise become freed from it.

In a preferred embodiment of the invention the arrangement which has just been explained is duplicated, so that two leaders are used, carrying four hooks which are initially positioned equidistantly around the surface of the body member, all resiliently held under a single band 8. This is the arrangement shown in the drawing. Both of the leaders are passed through a single ring 7, which is easily accomplished if the ring be set in a shallow kerf formed in the trailing end of the plug body in such a way that the plane of the ring lies at an oblique angle to both of the diametrical planes in each of which are formed the two slots 6 for one of the leaders. This arrangement is best shown in Fig. 3, from which it will be noted that each of the leaders penetrates the ring at such an angle with very little if any change in direction of the leader where it passes through the ring. Thus there is no chance of the leader becoming twisted or fouled in the ring.

It will be understood that if the second leader and pair of hooks be used, this additional leader and pair of hooks are identical with the first and are held in position and operate in exactly the same manner as previously explained. For this reason the same reference numerals are used in the drawing to designate both leaders and the hooks of both sets, and no further description of them is required.

As has been explained, the ring 7 is tied to the end of the line 11 and is held on the plug body solely because it is too large to pass through the bore 12 and because the leaders maintain it up against the body, as in the kerf provided for it. When a fish takes one of the hooks and pulls it to its limit of separation from the body, as shown in Fig. 4, the fish is held captive solely by the combination of the line, ring, leader and hook. The plug body is no part of this combination. It follows from this fact that if any part of the holding combination should break, so that the fish escapes, the fish will not be able to make off with the plug body. Thus, if the leader breaks, the body remains attached to the line by the ring 7. If the ring should break or become separated from the line 11, or if the line should break anywhere along its length, the fish will escape with the hook or pair of hooks and perhaps a part of the line, but the plug body will be released and float on the surface of the water where it can be retrieved by the fisherman. Hence the preferred arrangement of mounting the plug body on the line insures against loss of the body under any circumstances. I regard this as an important feature of the invention.

It is to be understood that the invention is capable of being embodied in other and further modified forms, all within its spirit and principles as pointed out by the appended claims.

I claim:

1. A fish plug comprising a body member having an eye at its trailing end portion, a leader penetrating said eye and slidable therethrough, a hook fastened to each opposite end of the leader, means securing the hooks to the opposite sides of the body member, said means being yieldable so as to operate, when one of the hooks is pulled, to free said hook from the body member and so as to operate thereafter, when the leader is pulled through the eye, to free the other hook from its position on the body member, and an enlargement on each hook preventing the hook from being pulled through the eye whereby the first freed hook is kept tethered to the body member while capable of being moved a limited distance therefrom.

2. A fish plug as claimed in claim 1 in which the yieldable means is a spring band encircling the body member and holding the hooks against the body member.

3. A fish plug as claimed in claim 1 in which said body member is provided with lengthwise slots in the sides thereof, and the yieldable means is a spring band encircling the body member and holding each of the hooks in one of said slots.

4. A fish plug as claimed in claim 1 in which said body member is provided with lengthwise slots in the sides thereof, and the yieldable means is a spring band encircling the body member and holding the shank of each of the hooks in one of said slots with the point of each hook facing the forward or leading end of the body member.

5. A fish plug comprising a body member having a trailing end portion provided with an eye, a pair of leaders penetrating said eye and slidable therethrough, a hook fastened to each opposite end of each of the leaders, means securing the hooks of each leader to diametrically opposite parts of the surface of the body member so that the four hooks are spaced substantially equidistantly around the body member, said means being yieldable so as to operate, when one of the hooks is pulled, to free said hook from the body member and so as to operate thereafter, when the leader of said hook is pulled through the eye, to free the other hook fastened to said leader from its position on the body member, and means preventing each hook from being pulled through the eye whereby the first freed hook is kept tethered to the body member while capable of being moved a limited distance therefrom.

6. A fish plug as claimed in claim 5 in which the eye projects rearwardly from the longitudinal axis of the body member and is positioned in a plane oblique to each of the diametrical planes in which the two leaders are positioned.

7. A fish plug comprising a body member having a substantially lengthwise bore, a line extending through the bore having secured to its end a ring having a diameter larger than that of the bore and seated against the trailing end of the body member, a leader penetrating the ring and slidable therethrough, a hook fastened to each opposite end of the leader, means securing the hooks to the opposite sides of the body member, said means being yieldable so as to operate, when one of the hooks is pulled, to free said hook from the body member and so as to operate thereafter, when the leader is pulled through the ring, to free the other hook from its position on the body member, and means preventing each hook from being pulled through the ring whereby the first freed hook is kept tethered to the body member while capable of being moved a limited distance therefrom.

GEORGE HENRY PATTERSON.

REFERENCES CITED

The following references are of record in the file of this patent:

UNITED STATES PATENTS

| Number | Name | Date |
| --- | --- | --- |
| 1,816,725 | Freeman | July 28, 1931 |
| 2,181,254 | Wilson | Nov. 28, 1939 |
| 2,246,757 | Rosegard | June 24, 1941 |
| 2,373,417 | Rosegard | Apr. 10, 1945 |

FOREIGN PATENTS

| Number | Country | Date |
| --- | --- | --- |
| 111,322 | Australia | Feb. 15, 1939 |